(12) United States Patent  (10) Patent No.: US 6,643,127 B1
Richardson  (45) Date of Patent: Nov. 4, 2003

(54) IN-MONITOR DOCKING STATION TO INTEGRATE A LAPTOP COMPUTER INTO A DESKTOP COMPUTER SYSTEM

(76) Inventor: Brian Edward Richardson, 18675-P Adams Ct., Morgan Hill, CA (US) 95037

( * ) Notice: Subject to any disclaimer, the term of this patent is extended or adjusted under 35 U.S.C. 154(b) by 17 days.

(21) Appl. No.: 10/079,162

(22) Filed: Feb. 19, 2002

(51) Int. Cl.[7] ................................................ G06F 1/16
(52) U.S. Cl. ..................... 361/686; 361/679; 312/223.4; 345/121
(58) Field of Search ................................ 361/679–687, 361/724–727; 312/223.1–223.6; 345/121

(56) References Cited

U.S. PATENT DOCUMENTS

| 6,532,146 B1 | * | 3/2003 | Duquette | 361/681 |
| 2001/0000447 A1 | * | 4/2001 | Thompson | 361/686 |
| 2002/0122290 A1 | * | 9/2002 | Davis, IV | 361/683 |
| 2002/0135977 A1 | * | 9/2002 | Yin et al. | 361/686 |

* cited by examiner

*Primary Examiner*—Darren Schuberg
*Assistant Examiner*—Hung Van Duong
(74) *Attorney, Agent, or Firm*—The Kline Law Firm

(57) ABSTRACT

An in-monitor docking station that enables a portable computer to be quickly and easily installed in a desktop environment includes a desktop monitor, and receives the portable computer through a door in the top of the monitor unit. The docking station is constructed with at least one electrical connector mate that receives the connector(s) of the laptop unit. An ejection mechanism, typically one or more springs, partially ejects the portable computer from the monitor unit when the latching unit actuator button is depressed. The only modification required for any portable computer to be compatible with the in-monitor docking station is a small recess in a bottom surface that receives the latch hook of the latching arm. Any additional components of a desktop system that are desired by the user can of course be added to the in-monitor docking station of the present invention, either in the unit itself, or as a peripheral device.

18 Claims, 6 Drawing Sheets

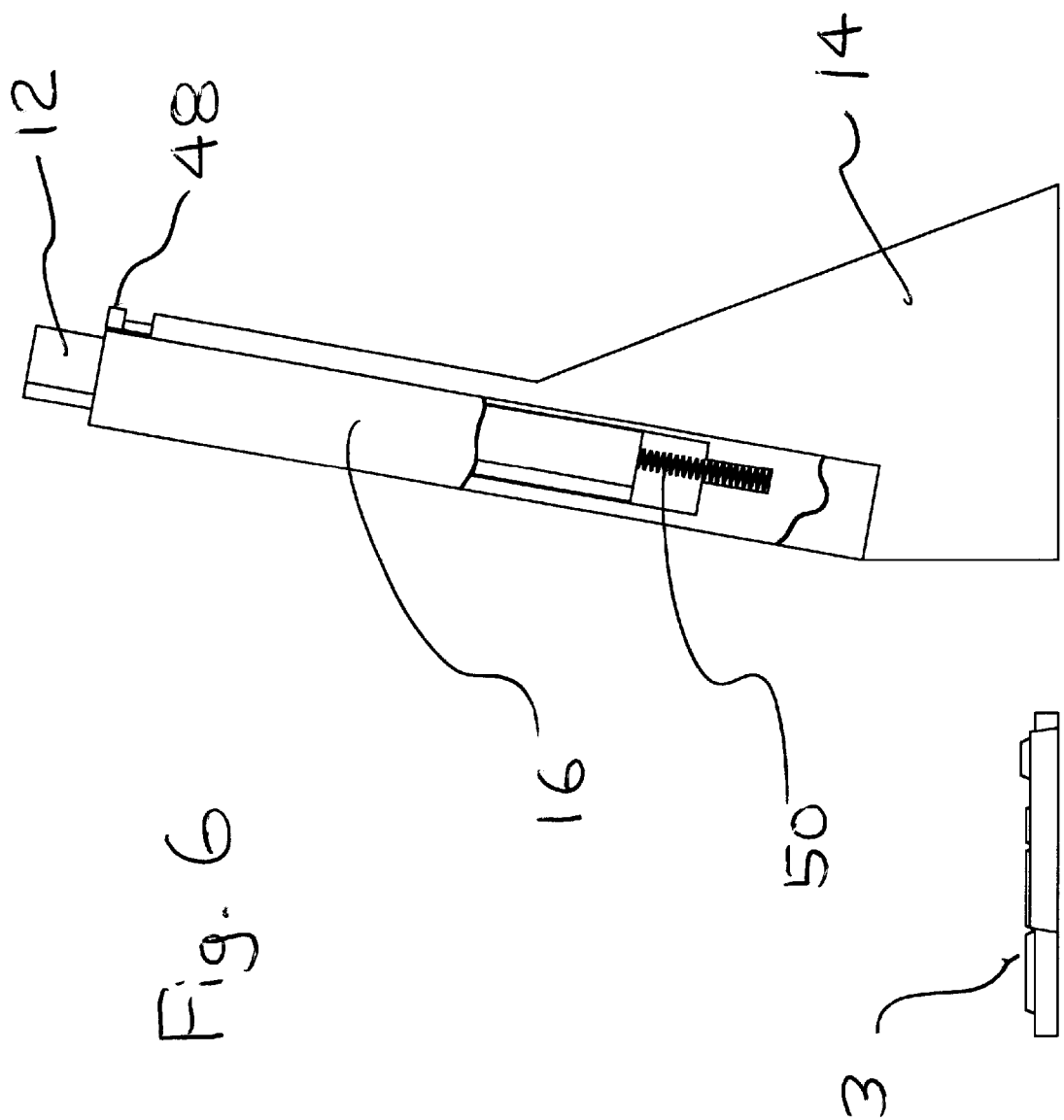

IN-MONITOR DOCKING STATION TO INTEGRATE A LAPTOP COMPUTER INTO A DESKTOP COMPUTER SYSTEM

BACKGROUND OF THE INVENTION

1. Field of the Invention

The present invention relates generally to computer equipment, and more particularly is a docking station that allows a user to integrate a laptop computer into a desktop computer system with minimal installation effort.

2. Description of the Prior Art

A typical personal computer system is illustrated in FIG. 1. Fairly standard current art equipment includes a desktop computer 1 and a portable computer 2. Portable computers include those devices known as laptop computers and notebook computers, as well as various other devices. Portable computers are designed to give their users computing capability even when the user is away from his office. These computers are small enough to be easily carried, and have independent power supplies (batteries) so that the user can use them wherever he may be.

The desktop computer 1 is equipped with a large, easy to use keyboard 3 and usually a mouse 4. The portable computer 2 is typically equipped with a much smaller keyboard 5 which can be awkward to use. If a mouse is provided for the laptop, it is typically far less efficient than the desktop mouse 4. Beyond these physical limitations, the biggest problem in a personal computer system including both a desktop computer and a portable computer is transferring work done on the portable computer to the desktop computer for storage or further use.

Early versions of portable computers communicated with the user's main data base by the user simply copying files onto a disk, and transferring the files to the main data base in a two step process. The work done away from the office on the portable computer could then be used in the desktop system. For small amounts of data, this method was satisfactory. However, as personal computers' capabilities expanded, the amount of data generated by portable computers also expanded. To keep pace with the expanded amount of data that needed to be transferred, software packages that allowed direct cable connections for downloading from the portable to the desktop were developed, e.g. LapLink™ and the like.

With the current capabilities of processors, portable computers have the capability to run almost any software package that can be run on a desktop. Accordingly, large data bases, such as spread sheets and graphics, can be generated on portable computers. Processing these files between the portable and the desktop by conventional means can be time consuming and inconvenient. Moreover, because the portable's capabilities are equal, or very nearly so, to the desktop computer, it is essentially redundant to have, in addition to the portable computer, a desktop computer with independent memory, processors, and software.

Accordingly, it is an object of the present invention to provide a means to directly install a portable computer into a desktop system, thereby enabling the user to take advantage of the generally easier to use desktop accessories (mouse, keyboard, internet and telephone connections, etc., and particularly a desktop monitor) while using only the portable computer.

It is a further object of the present invention to avoid redundancies in hardware and software, the docking station of the present invention enabling the user to use the memory and software of the portable computer in the desktop environment.

SUMMARY OF THE INVENTION

The present invention is an in-monitor docking station that enables a portable computer to be quickly and easily installed in a desktop environment. The docking station comprises a desktop monitor, and receives the portable computer through a door in the top of the monitor unit. The docking station is constructed with at least one electrical connector mate that receives the connector(s) of the laptop unit. An ejection means, typically one or more springs, partially ejects the portable computer from the monitor unit when the latching unit actuator button is depressed. The only modification required for any portable computer to be compatible with the in-monitor docking station of the present invention is a small recess in a bottom surface to receive the latch hook of the latching arm. Any additional components of a desktop system that are desired by the user can of course be added to the in-monitor docking station of the present invention, either in the unit itself, or as a peripheral device.

An advantage of the present invention is that it provides a desktop system with a portable computer integral to the system. The portable computer is quickly and easily installed in a monitor unit of the desktop system.

Another advantage of the present invention is that it allows the user to use the desktop peripheral equipment with the portable computer.

A still further advantage of the present invention is that it allows the user to install only one set of software in the system.

Yet another advantage of the present invention is that it allows the user to eliminate hardware duplication between his portable computer and his desktop computer.

These and other objects and advantages of the present invention will become apparent to those skilled in the art in view of the description of the best presently known mode of carrying out the invention as described herein and as illustrated in the drawings.

BRIEF DESCRIPTION OF THE DRAWINGS

FIG. 6 is a side view of the of the personal computer system sectioned so as to show the ejector means.

DETAILED DESCRIPTION OF THE INVENTION

Figure 1:
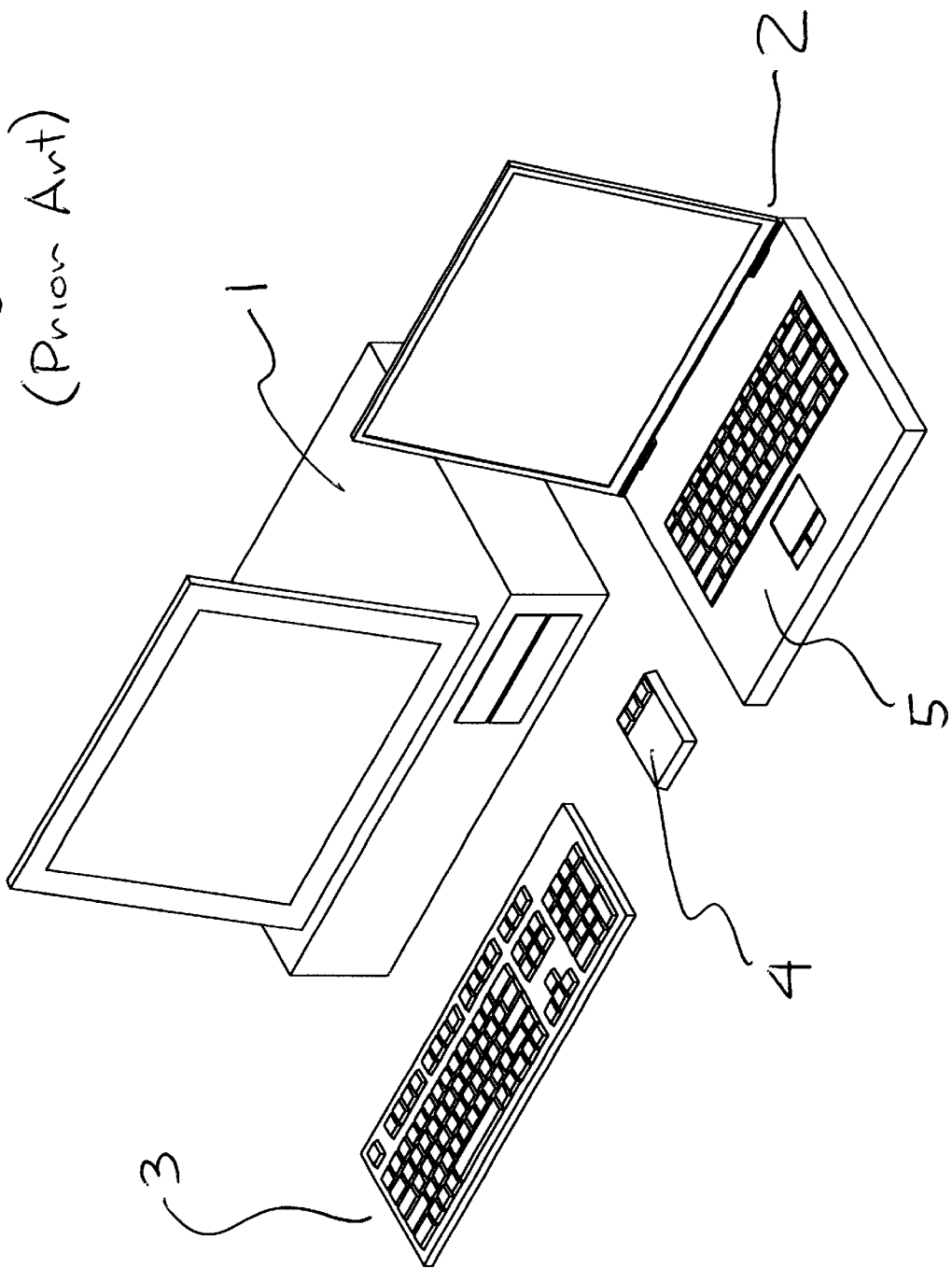
FIG. 1 is a perspective view of a prior art personal computer system showing both desktop and portable computer components.
Figure 2:
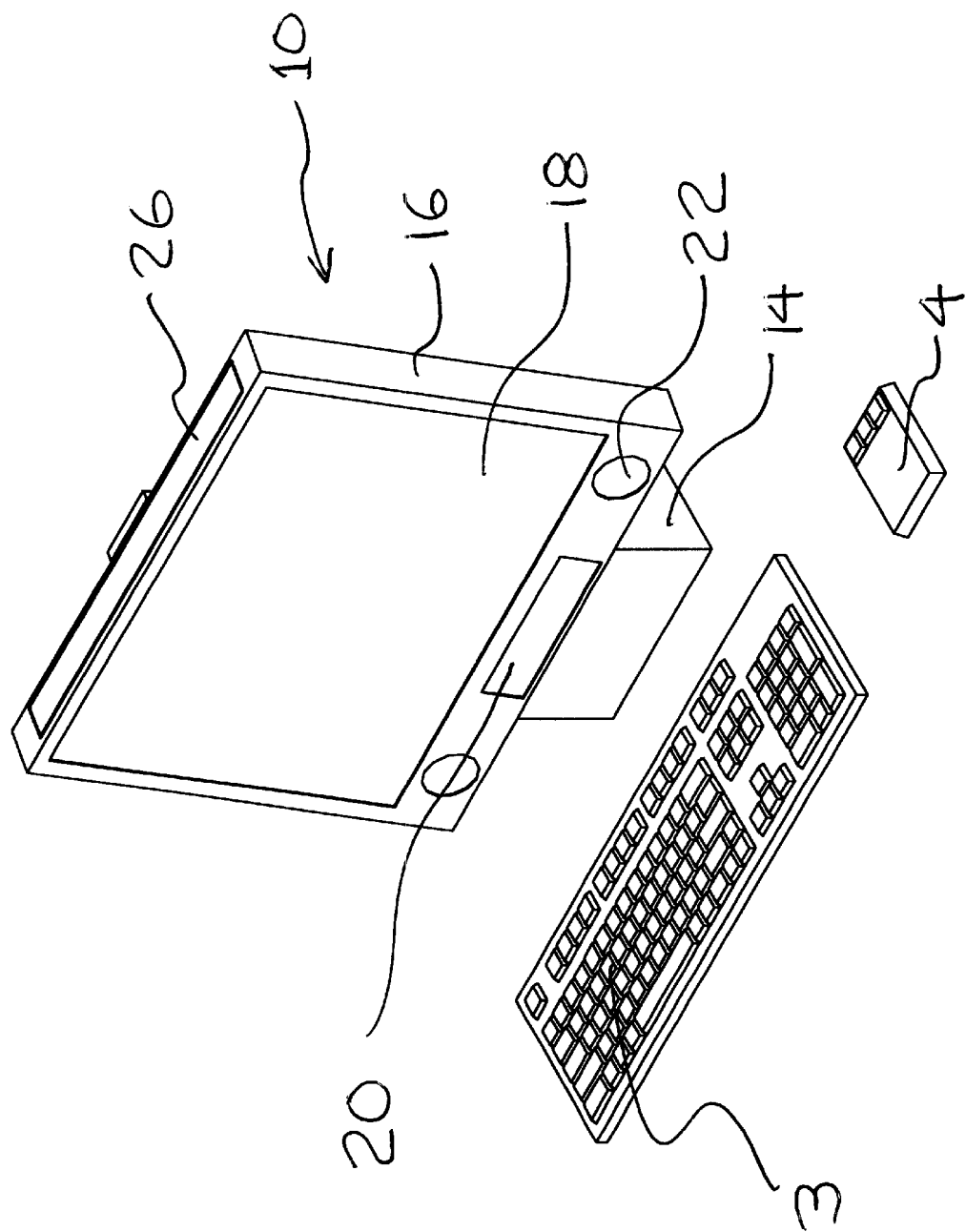
FIG. 2 is a perspective view of a personal computer system featuring the in-monitor docking station of the present invention.
Figure 3:
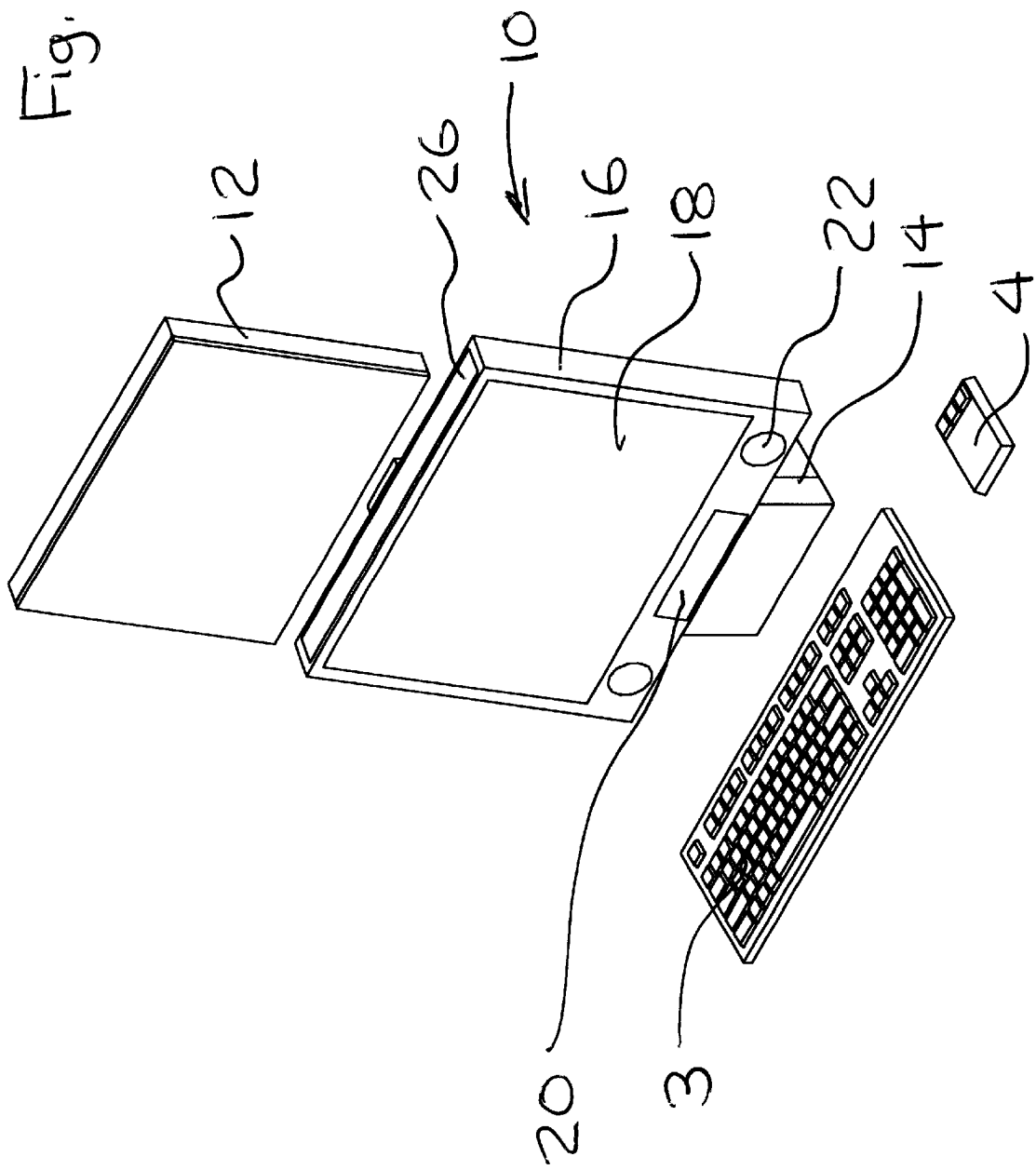
FIG. 3 is a perspective view of the personal computer system shown in FIG. 2 with the portable computer removed from the in-monitor docking station.
Figure 4:
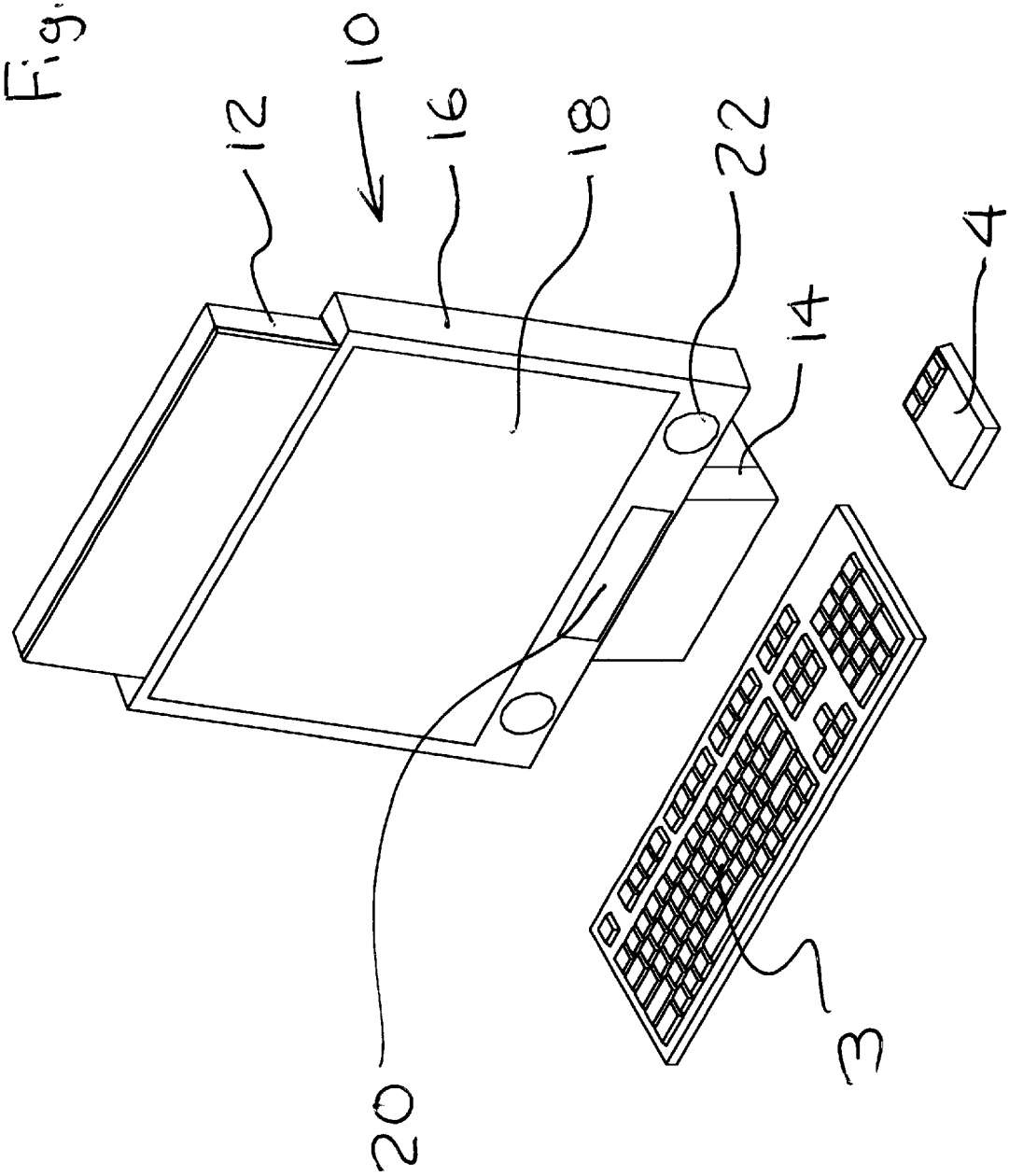
FIG. 4 is a perspective view of the personal computer system with the portable computer in an ejected position.

Referring first generally to FIGS. 2–4, the present invention is an in-monitor docking station 10 that enables a portable computer 12 such as a laptop or notebook computer to be quickly and easily installed in a desktop system environment. The in-monitor docking station 10 comprises a base 14 that supports a docking station main body 16. The in-monitor docking station 10 further comprises several system components typically associated with a desktop system. These components will typically include a monitor screen 18, a supplemental drive 20 (such as a CD drive or a floppy disk drive), and speakers 22.

The base 14 includes angling means to allow the monitor screen 18 to be tilted and swivelled for viewing convenience. The angling means are not shown in the drawings, as several such mechanisms are well known in the art. The base 14 or the main body 16 will also typically house output connectors for the computer system. The base 14 may also be equipped with a storage area.

The portable computer 12 is received in a computer receiving slot 24 in the interior of the docking station main body 16 through a hinged door 26 installed in a top side of the docking station main body 16. The interior of the main body 16 is constructed with at least one electrical connector mate 28 that receives the electrical connector(s) 30 of the portable computer 12.

Figure 5:
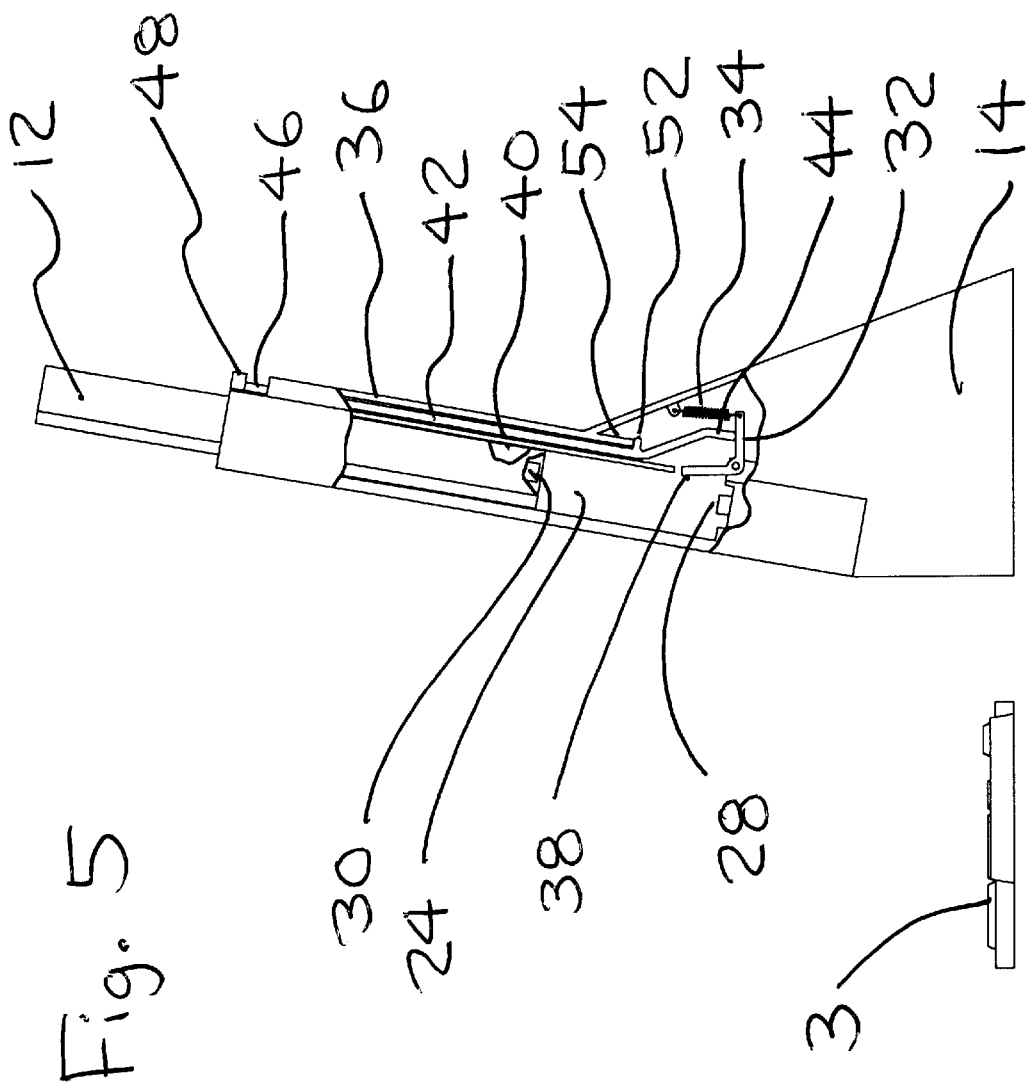
FIG. 5 is a side view of the of the personal computer system sectioned so as to show the electrical connector means and the latching unit.

The portable computer 12 is held in place in the interior of the main body 16 by a latching unit illustrated in FIG. 5. The latching unit comprises a pivotable latch arm 32, a latch spring 34, and an actuator 36. A latch hook 38 on a first end of the latch arm 32 engages a recess 40 on a rear side of the portable computer 12. (The recess 40 is the only modification to a standard portable computer required to make the portable computer compatible with the in-monitor docking station of the present invention.) A second end of the latch arm 32 is connected to the latch spring 34. The latch spring 34 will typically be anchored to the interior of the base 14. The latch spring 34 biases the first end of the latch arm 32 toward the interior of the main docking station body 16 so that the latch hook 38 is firmly seated in the recess 40 when the portable computer 12 is completely installed in the computer receiving slot 24 as shown in FIG. 2.

The actuator 36 comprises an elongated rod 42 with a first end 44 that is in communication with the latch arm 32. The second end 46 of the actuator 36 has an actuator button 48. When a user depress the actuator button 48, the elongated rod 42 is moved downward, rotating the latch arm 32 so that the latch hook 38 disengages from the recess 40 in the rear side of the portable computer 12. This causes the portable computer 12 to be partially ejected from the computer receiving slot 24 by at least one ejector spring 50 mounted on the bottom side of the computer receiving slot 24. (See FIG. 6.) The in-monitor docking station 10 then has the configuration shown in FIG. 4. The user can then easily remove the portable computer 12 from the desktop installation for off-site use.

The latch arm 32 is prohibited from extending too far into the interior of the main docking station body 16 and thereby impeding installation of the portable computer 12 by a stop block 52 on the elongated rod 42 of the actuator 36. The stop block 52 contacts a blocking element 54 on the base 20 or any other area of the housing of the in-monitor docking station 10. When the stop block 52 contacts the blocking element 54 the inward motion of the latch arm 32 is stopped so that the bottom edge of the computer 12 is able to slide by the latch hook 38 to the fully installed position, in which the latch hook 38 engages the recess 40.

Any additional peripheral components of a desktop system that are desired by the user of the computer system of the present invention can of course be added to the in-monitor docking station 10. The additional peripherals can be installed either in the docking station unit 10 itself, or simply in close proximity to the docking station 10 on the desktop.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A docking station for a portable computer comprising:

a base supporting a docking station main body, a desktop monitor in communication with said docking station main body, and at least one electrical connector mate mounted in said docking station main body; wherein said portable computer is received in a computer receiving slot in an interior of said docking station main body such that said at least one electrical connector mate connected to said desktop monitor receives a corresponding electrical connector of said portable computer, said portable computer thereby being in communication with said desktop monitor.

2. The docking station defined in claim 1 wherein:

when said portable computer is disengaged from said docking station main body, said portable computer is partially ejected from said computer receiving slot by at least one ejector spring mounted on a bottom side of said computer receiving slot.

3. The docking station defined in claim 1 wherein:

when said portable computer is received in said computer receiving slot of said docking station main body, a surface of said portable computer is in an orientation generally parallel to a viewing surface of said monitor.

4. The docking station defined in claim 1 wherein:

said portable computer is held in place in said interior of said docking station main body by a latching unit.

5. The docking station defined in claim 1 wherein:

said docking station further comprises speakers.

6. The docking station defined in claim 1 wherein:

said docking station further comprises a disk drive.

7. The docking station defined in claim 2 wherein:

said docking station further comprises speakers.

8. The docking station defined in claim 2 wherein:

said docking station further comprises a disk drive.

9. The docking station defined in claim 3 wherein:

said docking station further comprises speakers.

10. The docking station defined in claim 3 wherein:

said docking station further comprises a disk drive.

11. The docking station defined in claim 4 wherein said latching unit comprises:

a pivotable latch arm, a latch spring that biases said latch arm toward said interior of said docking station main body, and an actuator; wherein a latch hook on a first end of said latch arm engages a recess in a rear side of said portable computer when said portable computer is fully installed in said docking station main body.

12. The docking station defined in claim 4 wherein:

said docking station further comprises speakers.

13. The docking station defined in claim 4 wherein:

said docking station further comprises a disk drive.

14. The docking station defined in claim 11 wherein said actuator comprises:
   an elongated rod with a first end in communication with said latch arm, and
   a second end of said actuator has an actuator button; such that
      when a user depresses said actuator button, said elongated rod rotates said latch arm so that said latch hook disengages from said recess in said rear side of said portable computer, thereby causing said portable computer to be partially ejected from said computer receiving slot by at least one ejector spring mounted on a bottom side of said computer receiving slot.

15. The docking station defined in claim 11 wherein: said docking station further comprises speakers.

16. The docking station defined in claim 11 wherein: said docking station further comprises a disk drive.

17. The docking station defined in claim 14 wherein: said docking station further comprises speakers.

18. The docking station defined in claim 14 wherein: said docking station further comprises a disk drive.

* * * * *